United States Patent [19]

Yamanaka

[11] 4,148,573
[45] Apr. 10, 1979

[54] CAMERA INCORPORATING ELECTRONIC FLASH UNIT

[75] Inventor: Akira Yamanaka, Sakai, Japan

[73] Assignee: Minolta Camera Kabushiki Kaisha, Osaka, Japan

[21] Appl. No.: 777,988

[22] Filed: Mar. 16, 1977

[30] Foreign Application Priority Data

Apr. 8, 1976 [JP] Japan .................................. 51/39877

[51] Int. Cl.² .......................................... G03B 15/03
[52] U.S. Cl. ................................................. 354/145
[58] Field of Search ............... 362/3, 9; 354/145, 126, 354/148, 149, 202, 288

[56] References Cited

U.S. PATENT DOCUMENTS

| T896,007 | 3/1972 | Stoneham et al. | 354/126 |
|---|---|---|---|
| 2,783,696 | 3/1957 | Sewig | 354/126 |
| 3,523,496 | 8/1970 | Nerwin | 354/288 |
| 3,559,548 | 2/1971 | Ackerman | 354/145 X |
| 3,851,163 | 11/1974 | Stacy | 354/148 X |
| 4,051,494 | 9/1977 | Fujita et al. | 362/3 |

FOREIGN PATENT DOCUMENTS

| 257353 | 10/1967 | Austria | 354/126 |
|---|---|---|---|
| 1404405 | 5/1965 | France | 354/126 |

*Primary Examiner*—Donald A. Griffin
*Attorney, Agent, or Firm*—Wolder, Gross & Yavner

[57] ABSTRACT

An electronic flash unit and a cartridge compartment for receiving an exchangeable film cartridge are disposed respectively at a forward part and a rear part of the inside space of a camera housing of a rectangular parallelepiped configuration which is thin in the upward and downward direction. An elongate cell compartment for receiving an electric cell for the electronic flash unit is also disposed within the camera housing between the cartridge compartment and the electronic flash unit at an oblique angle with respect to the forward and rearward direction. The cartridge compartment and the electronic flash unit are mutually separated in the forward and rearward direction such that the distance between the cartridge compartment and the electronic flash unit in the lateral direction is shorter than the width of the cell compartment.

11 Claims, 6 Drawing Figures

CAMERA INCORPORATING ELECTRONIC FLASH UNIT

BACKGROUND OF THE INVENTION

The present invention relates generally to a compact or small size camera having a built in electronic flash and it relates more particularly to a low profile, compact camera.

In a small size camera of the present type, the arrangement of an electronic flash device within the camera body greatly influences the size of the camera body. It has been a recent trend to reduce the sizes of the light-emitting portion and the main capacitor, both of which are essential components of the electronic flash device, although these attempts have met only partial success. However, a further reduction in the size of these components is desired for ease of accommodation in a small size camera. Meanwhile, an increase in the capacity of the cell or battery serving as a potential source for the electronic flash device is required, so as to shorten the charging interval for the main or storage capacitor to increase a flashing cycle, or for the purposes of common use as the power source for an electric shutter of the camera and for a brightness warning lamp. Thus, it follows that a bulky cell has to be positioned in the camera.

A camera itself should desirably be compact in size from the viewpoints of portability, convenience and operability. However, the electronic flash device including the battery or cell, which occupies a large space in the camera body, imposes a limitation on any reduction in the size of the camera body, and an increase in the capacity of the cell leads to an accompanying increase in the size of the camera body.

SUMMARY OF THE INVENTION

It is an object of the present invention to provide a camera incorporating an electronic flash unit, which camera is compact in size due to improved disposition of a cell compartment for receiving an electric battery of one or more electric cells for the electronic flash unit.

Another object of the present invention is to provide a camera of the above type which is compact in size but in which the so-called red-eye phenomenon is less conspicuous.

To accomplish the above objects, a camera of the present invention comprises a camera housing of substantially rectangular parallelopiped configuration which is thin in the upward and downward direction and which delineates a space or cavity therein. An electronic flash unit and a cartridge compartment means for receiving an exchangeable film cartridge are disposed within the camera housing respectively at a substantially forward part and at a substantially rear part of the camera housing space whereas a battery compartment means of an elongate shape for receiving an electric battery of one or more electric cells for the electronic flash unit is also disposed within the camera housing between the electronic flash unit and the cartridge compartment means and is at an oblique angle to the forward and rearward direction. The cartridge compartment and the electronic flash unit are mutually separated or out of register in the forward and rearward direction such that the distance between the cartridge compartment and the electronic flash unit in the lateral direction is shorter than the width of the battery compartment.

With the above disposition of components, the size of the camera housing in the lateral direction is shortened as compared with the case where the battery compartment means of an elongate shape is disposed within the camera housing between the electronic flash and the cartridge compartment means so as to orient the longitudinal axis thereof in the forward and rearward direction (see FIG. 2) or in the case where the battery compartment means of an elongate shape is disposed within the camera housing at a side of the cartridge compartment means and behind the electronic flash unit so as to orient the longitudinal axis thereof in the lateral direction (see FIG. 3) because the total distance between the cartridge compartment means and the electronic flash unit is shortened as compared with the above cases.

In addition, so-called red-eye phenomenon will become inconspicuous as compared with the case where the battery compartment means of an elongate shape is disposed within the camera housing at an outer side of the electronic flash unit, i.e., where the electronic flash unit is disposed between the battery compartment means of an elongate shape and the cartridge compartment means (see FIGS. 1(a) and 1(b)) because the distance between the electronic flash unit and the camera objective lens disposed in front of the cartridge compartment means is lengthened as compared with the above case.

In a preferred embodiment of the present invention, the battery compartment means has an indicating symbol or indicia for indicating the polarity of the electric battery and the manner of insertion of the electric battery into the compartment means. The indicating symbol is disposed at an inner wall of the cell compartment means adjacent to its rear end exposed to the exterior of the camera housing so as to be observed from the rear side of the camer housing. As the cartridge compartment means is inclined with respect to the forward and rearward direction, the indicating symbol can be observed from the rear side of the camera housing. Therefore, the electric cell will not be erroneously inserted into the cell compartment means with adverse polarity.

The above and other objects and features of the present invention will become more apparent from the following description taken in connection with the accompanying drawings.

DESCRIPTION OF THE PREFERRED EMBODIMENT

Figure 1A:
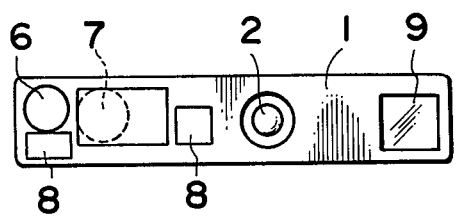
FIG. 1(a) is a front elevational view of a camera having a reference structure.
Figure 1B:
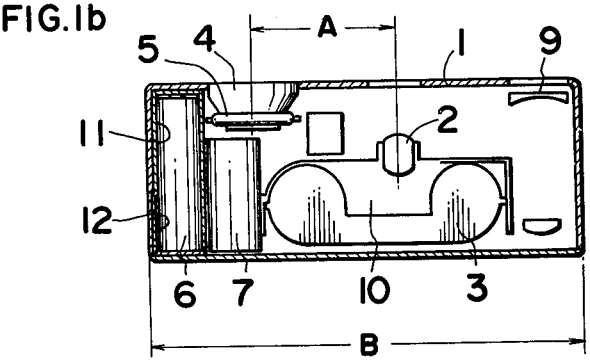
FIG. 1(b) is a plan cross-sectional view of the camera shown in FIG. 1(a)
Figure 2:
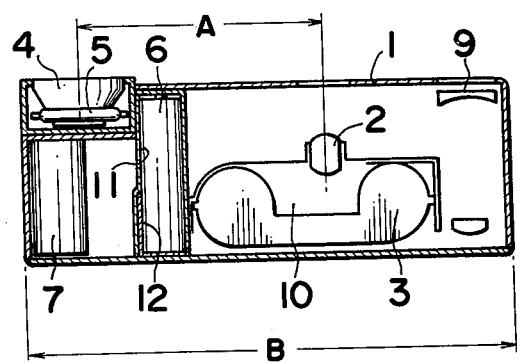
FIG. 2 is a plan cross-sectional view of a camera having another reference structure.
Figure 3:
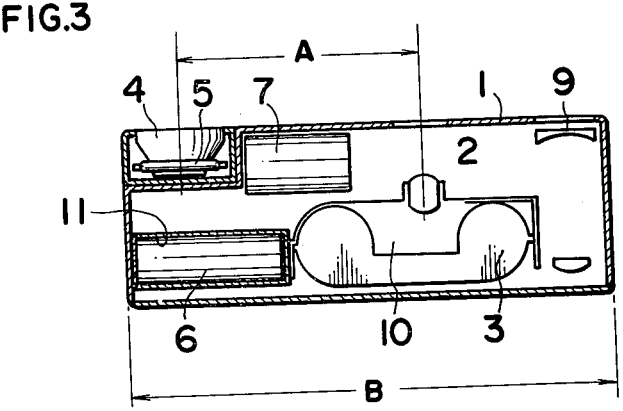
FIG. 3 is a plan cross-sectional view of a camera having still another reference structure.

FIGS. 1 through 3 illustrate the arrangement of electronic flash devices, which are shown for comparison purposes with the arrangement of the device according to the present invention, respectively; and FIG. 4 shows the arrangement of an electronic flash device which embodies the present invention.

Reference will first be had to the arrangement of the electronic flash device shown for comparison with that of the present invention. FIG. 1 shows an arrangement of a small size or compact camera which houses therein a battery of a comparatively large capacity. In this camera, an objective lens 2, a film cartridge 3, a light reflecting portion 4, an electronic flash tube 5, a cell 6, a main or storage capacitor 7, a firing circuit element 8 and a finder optical system 9 are positioned within camera body 1 in a compact, closely spaced fashion. In the electronic flash device mounting portion, the main capacitor 7 is located between the cell 6 and film chamber 10 housing the film cartridge 3 therein, while the light reflecting portion 4 and electronic flash tube 5 constituting a light emitting portion, are positioned forward of main capacitor 7 as viewed in the camera body. This arrangement may minimize the width B of the camera body 1. However, when flash photography is effected, since the light reflecting portion 4 is spaced too short, a distance A from the objective lens 2, there tends to occur the red-eye phenonmenon, in which the eyes of a person or the like appear red in the picture taken, thereby failing to achieve a desired function of a camera.

If the length A is increased to the order of 90 mm, the red-eye phenomenon becomes the least significant. The arrangement shown in FIG. 1, however, involves a danger of the length A being appreciably less than 90 mm.

Since the battery chamber 11 is provided in a manner to accommodate the power source cell 6 in parallel with the optical axis of the objective lens 2, if an information plate 12 for indicating the directions of the positive and negative poles of a cell is attached to the side wall of battery chamber 11, then a user can only observe with great difficulty any indication on information plate 12.

In FIG. 2 battery chamber or housing 11 is provided between the film chamber 10 and an electronic flash device mounting portion in parallel with the optical axis of objective lens 2. The aforesaid electronic flash device mounting portion includes the main capacitor 7, light reflecting portion 4, electronic flash tube 5 and the firing circuit element (not shown). Light reflecting portion 4 is positioned remote from objective lens 2 thereby increasing the length A to more than 90 mm, so as to make the red-eye phenomenon inappreciable. With this arrangement, the space required for such positioning of the battery chamber 11 within the camera body is greatly increased, with the resulting increase in the width B of the camera body 1 towards light reflecting portion 4, thus failing to meet the requirement to reduce the size of the camera. Also in this arrangement, the difficulty occurs in the indication on information plate 12 so that the user can not err in placing the cell 6 into battery chamber 11, with its poles properly positioned.

A further arrangement is possible, as shown in FIG. 3, wherein battery chamber 11 is provided for housing a battery 6, with its longitudinal axis located at a right angle to the optical axis of objective lens 2. However, this also results in an increase in the width B of the camera body 1 towards light reflecting portion 4. Alternatively, battery 6 may be placed in battery chamber 11 from the left side of a camera, and an information plate (not shown) for indicating the direction in which a battery is to be inserted in battery chamber 11 may be attached to a cover (not shown) of battery chamber 11.

However, such a simple presentation by using a simple mark alone still fails to provide satisfactory instructions to the user.

Figure 4A:
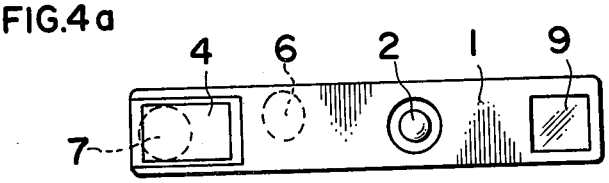
FIG. 4(a) is a front elevational view of a camera according to an embodiment of the present invention.
Figure 4B:
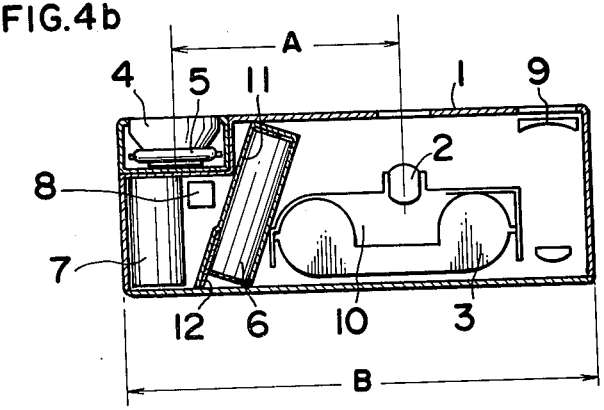
FIG. 4(b) is a plan cross-sectional view of the camera shown in FIG. 4(a).

In view of the foregoing circumstances, a camera having a built in electronic flash device, as shown in FIGS. 4a and 4b, is provided as an embodiment of the present invention. As shown, battery 6 which has been a problem in reducing the size of the camera body is placed, with its length being positioned along the camera body transverse or forward rearward axis, the optical axis of objective lens 2 in the specifically illustrated embodiment end of battery 6 on the front side of a camera being positioned closer to the camera body medial transverse axis or the optical axis of the objective lens than the other end of battery 6 at the rear side of the camera. In addition, the battery chamber 11 is so positioned that battery 6 may be located between film chamber 10 and light reflecting portion 4 and electronic flash tube 5. Film chamber 10 and light reflecting portion 4 and flash tube 5 are out of register in the direction of the optical axis of objective lens 2 such that the distance therebetween in the lateral direction is shorter than the width of cell chamber 11.

Information plate 12 for indicating the direction of poles of battery 6 is attached to the inclined inner wall of battery chamber 11. It should be noted that the battery 6 may consist of a single cell or a plurality of end-to-end cells which may be individual or joined as a unit.

With this arrangement, the light emitting portion 4 and electronic flash tube 5 may be placed in the space left by cell chamber 11, at a minimum distance A from objective lens 2 at which distance the red-eye phenomenon becomes insignificant. Thus, the width B of the camera body 1 is appreciably reduced, and hence a compact camera of small size is achieved. Information plate 12 for the battery orientation is attached to an inclined wall surface of the battery chamber, so that one can easily view the information plate 12 from the rear of the camera thus preventing the erroneous positioning of the poles of a battery in the battery chamber.

Furthermore, according to the present invention, the light reflecting portion 4 and the electronic flash tube 5 may be positioned at a minimum distance, for example 90 mm, from the objective lens 2. Should the light reflecting portion 4 be designed so as to be located too close to objective lens 2, since light reflecting portion 4 and electronic flash tube 5 are positioned to the left in camera body 1, light reflecting portion 4 and electronic flash tube 5 may be slid to the left of the camera body 1 to pop out of the camera body.

In the embodiment shown, simple improvement in arrangement of the battery or cell chamber 11 enables a marked reduction in the size of the camera, which is free of any red-eye phenomenon, upon flash photographing, with the accompanying improved visibility of an information plate for the battery to be positioned in the battery chamber.

I claim:

1. A camera for use with replaceable film cartridge and at least one electric battery comprising;
    a camera housing of substantially rectangular parallelopiped configuration which is thin in the upward and downward direction and which delineates a space therein;
    cartridge compartment means for receiving said film cartridge, said cartridge compartment means being disposed within said camera housing at substantially a rear part of said space;

an electronic flash unit supplied with an electric power from said electric battery and disposed within said camera housing at substantially a forward part of said space; and battery compartment means for receiving said electric battery, said battery compartment means having an elongate shape and being disposed within said camera housing between said cartridge compartment means and said electronic flash unit and being inclined with respect to the forward and rearward direction, said cartridge compartment means and said electronic flash unit abutting said battery compartment means at spaced locations in said forward and rearward directions, and said cartridge compartment means and said electronic flash unit being out of register with each other in the forward and rearward direction such that the distance between said cartridge compartment means and said electronic flash unit in the lateral direction is shorter than the width of said battery compartment means.

2. A compact camera comprising a camera housing of substantially rectangular parallelopiped configuration with a relatively short forwardly rearwardly extending transverse axis and a relatively long laterally extending longitudinal axis, means defining a replaceable film cartridge holding compartment disposed in the rear portion of said camera housing, an electronic photoflash unit including a forwardly directed flash bulb located in said camera housing proximate a forward corner thereof, and elongate compartment means for replaceably housing a battery for energizing said photoflash unit, said camera being characterized by said film cartridge compartment means and said photoflash unit having their proximate edges laterally separated a distance less than the width of said battery compartment means and being transversely separated to delineate an opening, said battery compartment means extending from the rear portion toward the front portion of said housing through said opening at an oblique angle to said transverse and longitudinal axes, said proximate edges of said cartridge compartment means and said photoflash unit being in engagement with said battery compartment means at spaced locations along said transverse axis.

3. The invention according to claim 2, the sum of said distance and the width of said photoflash unit along said longitudinal axis being shorter than the length of said battery compartment means.

4. The invention according to claim 1, the distance between said cartridge compartment means and said electronic flash unit in the lateral direction also being shorter than the difference between the length of said battery compartment means and the width of the electronic flash unit in the lateral direction.

5. A camera as defined in claim 4, wherein the longitudinal length of said battery compartment means is longer than the width of said electronic flash unit in the lateral direction.

6. A camera as defined in claim 5, wherein said electric battery has a circular transverse cross-section and said battery compartment means has a cylindrical inner wall defining a space for receiving said electric battery.

7. A camera as defined in claim 4, further comprising an objective lens disposed in front of said cartridge compartment means, wherein the distance between said electronic flash unit and said objective lens in the lateral direction is approximately 90 mm.

8. A camera as defined in claim 4, further comprising an objective lens disposed in front of said cartridge compartment means and flash unit compartment means containing said electronic flash unit and being movable in the lateral direction to pop out of said camera housing to an operational position, wherein the distance between said objective lens and said electronic flash unit in the lateral direction is shorter than 90 mm when said flash unit compartment means is within said camera housing and approximately 90 mm when said flash unit compartment means is at said operation position.

9. A camera as defined in claim 4, further comprising a capacitor for receiving said electric power from said electric battery for storing electricity for firing said electronic flash unit, said capacitor being disposed within said camera housing at a rear part of said space behind said electronic flash unit and at a side of said battery compartment means.

10. A camera for use with replaceable film cartridge and at least one electric battery comprising:

a camera housing of substantially rectangular parallelopiped configuration which is thin in the upward and downward direction and which delineates a space therein;

cartridge compartment means for receiving said film cartridge, said cartridge compartment means being disposed within said camera housing at substantially a rear part of said space;

an electronic flash unit supplied with an electric power from said electric battery and disposed within said camera housing at substantially a forward part of said space; and battery compartment means for receiving said electric battery, said battery compartment means having an elongate shape and being disposed within said camera housing between said cartridge compartment means and said electronic flash unit and being inclined with respect to the forward and rearward direction, and said cartridge compartment means and said electronic flash unit being out of register with each other in the forward and rearward direction such that the distance between said cartridge compartment means and said electronic flash unit in the lateral direction is shorter than the width of said battery compartment means, said battery compartment means having a rear end exposed to the exterior of said camera housing, an inner wall defining a space for receiving said electric battery and an indicating symbol disposed at a position adjacent to said rear end so as to permit observation thereof from the rear side of said camera housing.

11. A camera as defined in claim 10, wherein said indicating symbol is one for indicating the polarity orientation of said electric battery upon the insertion of said electric battery into said space defined by said inner wall.

* * * * *